United States Patent [19]
Gould

[11] 3,944,117
[45] Mar. 16, 1976

[54] ROLLONET ASSEMBLY

[75] Inventor: Robert A. Gould, Ridgecrest, Calif.

[73] Assignee: The United States of America as represented by the Secretary of the Navy, Washington, D.C.

[22] Filed: Apr. 18, 1975

[21] Appl. No.: 570,123

Related U.S. Application Data

[63] Continuation of Ser. No. 811,696, March 26, 1969, abandoned.

[52] U.S. Cl. .............. 222/95; 222/386.5; 222/214
[51] Int. Cl.² .......................................... B65D 35/28
[58] Field of Search ................... 222/95, 214, 386.5

[56] References Cited
UNITED STATES PATENTS

| | | |
|---|---|---|
| 2,859,808 | 11/1958 | Younquist et al. ............... 222/386.5 |
| 3,592,360 | 7/1971 | Aleck ..................................... 222/95 |
| 3,847,307 | 11/1974 | Hosek ................................. 222/386.5 |

Primary Examiner—Samuel Feinberg
Attorney, Agent, or Firm—R. S. Sciascia; Roy Miller

[57] ABSTRACT

A rollonet designed to provide positive displacement of liquid rocket propellants for missle tankage comprising an inner and outer diaphragm each in the form of a continuous cylinder with a piston head therebetween. Gas pressure acting on the piston head imparts an axial thrust on the prerolled portions of the inner and outer cylinders, causing them to roll through 180° away from the tank wall in a progressive manner.

5 Claims, 2 Drawing Figures

ROLLONET ASSEMBLY

CROSS REFERENCE TO RELATED APPLICATION

This is a continuation of application Ser. No. 811,696 filed Mar. 26, 1969, abandoned.

BACKGROUND OF THE INVENTION

This invention relates to a system for positively expelling liquid propellant for a rocket motor or similar device.

In the construction and operation of liquid propellant propulsion systems for rocket motors, one of the major problems involves the release of the propellant to the rocket motor without the inclusion of bubbles. Another problem relates to the metering of the fuel which may involve starting and stopping the flow of the fuel at predetermined times and under predetermined pressures.

Various attempts have been made to provide such a system, among which is that disclosed in U.S. Pat. No. 2,505,798 which relates to a liquid propellant propulsion system and U.S. Pat. No. 2,609,118 which relates to providing an aircraft fuel tank for reducing the danger of explosions due to the mixing of gasoline vapors and air.

DESCRIPTION OF THE PREFERRED EMBODIMENT

Figure 1:
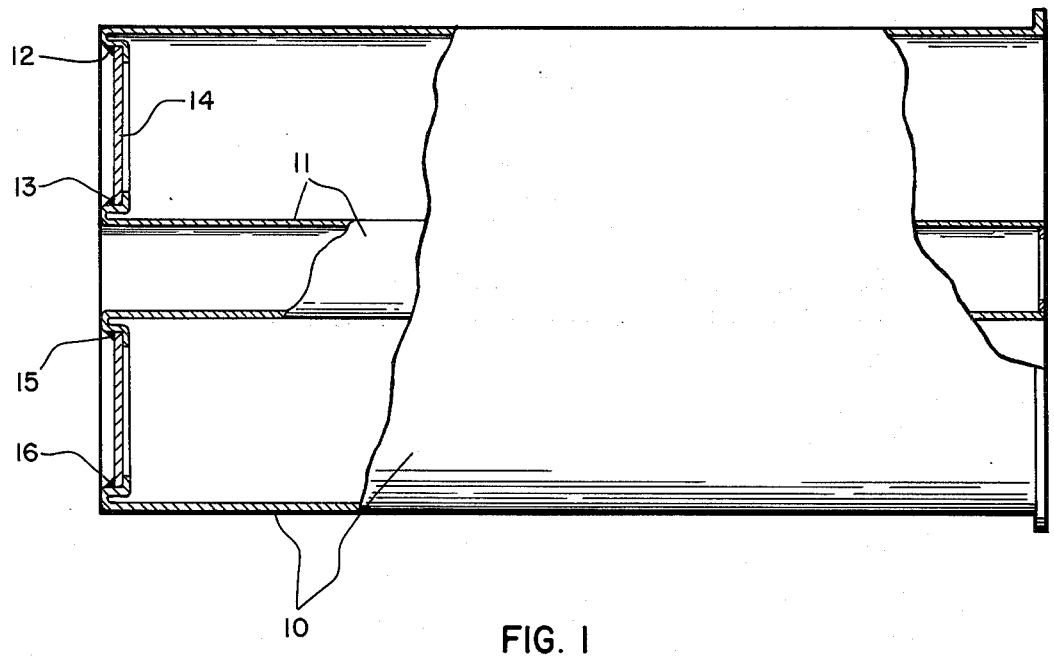
FIG. 1 is a cross section of the rollonet.

The rollonet is illustrated in FIG. 1 and comprises an outer diaphragm 10 formed of aluminum of an appropriate thickness and an inner diaphragm 11 formed of the same material. The inner and outer diaphragms are rolled to cylindrical shape and seam welded to form a continuous circular cylinder in each instance (seamless tubing might also be used). The outer diaphragm 10 is then spun to form an inwardly turned prerolled lip as at 12. The inner diaphragm 11 has an outwardly turned prerolled lip as at 13 which is also spun on at one end.

A piston head 14 is constructed in a flat or contoured configuration so that its inner diameter fits around the preroll 13 of the inner diaphragm in such a manner as to rest against the outwardly turned flange portion of the preroll. The outer diameter of the piston head 14 fits into the inwardly turned preroll 12 of the outer diaphragm in a similar manner.

The entire rollonet assembly is completed by welding the inner and outer diaphragms to the piston in the prerolled areas 15 and 16. The ends of the diaphragms 10 and 11 opposite the piston head 14 may be shaped to match the tank to be used.

Figure 2:
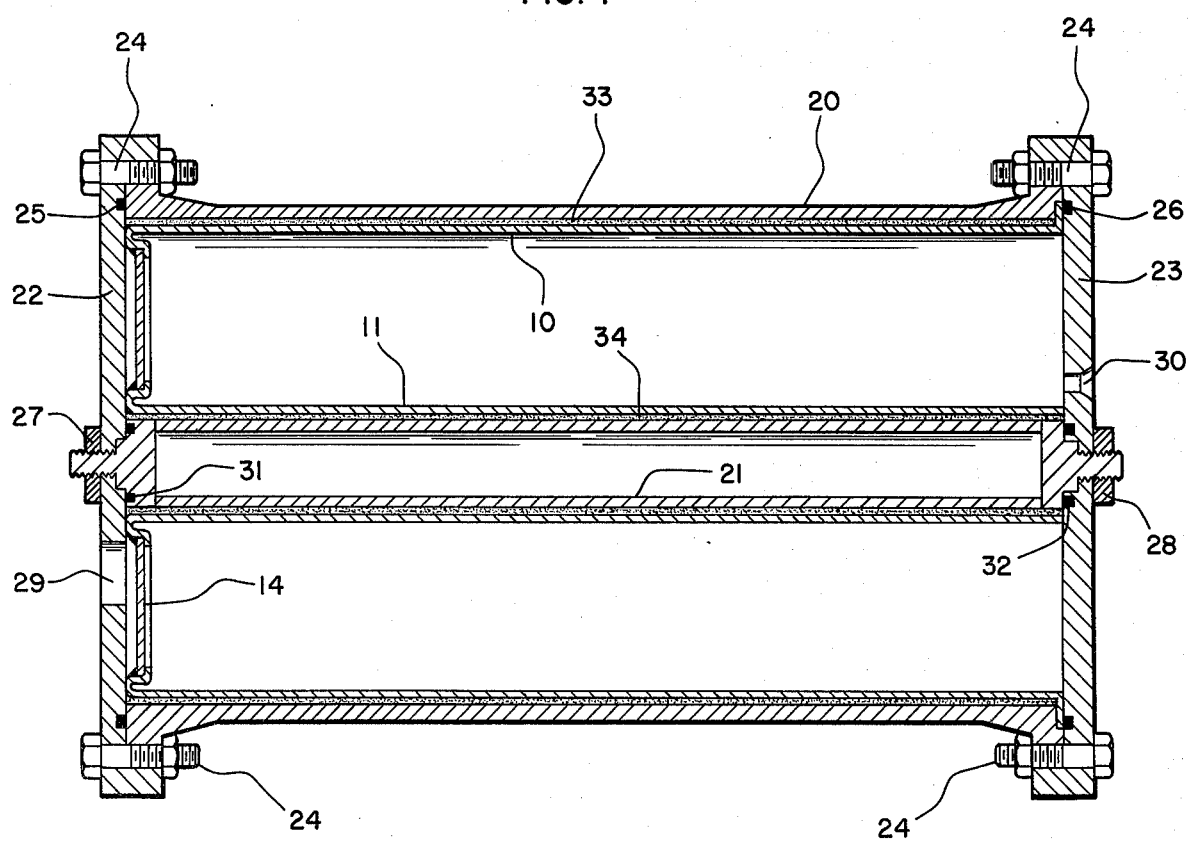
FIG. 2 is a rollonet-tank expulsion unit assembly in section.

The rollonet assembly of FIG. 1 is fitted into the tank support structure as shown in FIG. 2. The tank support structure comprises an outer tank 20, inner rollonet support tube assembly 21, forward end plate 22 and aft end plate 23. The forward end plates 22 and aft end plate 23 are secured to the outer tank 20 by means of bolts as shown at 24 or may be welded. Each of the end plates is also suitably grooved to receive and O-ring seal with the outer tank 20 as shown at 25 and 26, respectively. An O-ring seal is also provided between the support tube assembly and the forward and aft end plates as at 31 and 32 respectively.

The rollonet support tube assembly 21 is closed at either end and the closed ends threaded. The threaded ends protrude through openings in the forward and aft end plates and are held in position by means of nuts 27 and 28, respectively engaging the forward and aft end plates. It is to be understood, however, that other configurations and different assembly means may be used to reduce weight where necessary to accomodate weight limitations.

The outer diaphragm 10 and inner diaphragm 11 are bonded, as shown at 33 and 34, to the outer tank 20 and rollonet support tube assembly 21, respectively, by Teflon or a silicone rubber which in the present instance is GE RTV-511. The surfaces are suitably prepared by using a primer, in the present instance GE SS-4004.

An inlet pressurization port 29 is provided in the forward end plate in open communication with the piston head assembly 14 and an outlet port 30 is provided in the aft end plate 23 in open communication with the rollonet tank.

The rollonet assembly is bonded to the propellant tank by an adhesive, such as the TRV silicone rubber or Teflon in order to prevent pressurization gas from passing between the outer diaphragm 10 and tank wall 20. Such gas passage would result in collapse of the diaphragm. The inner diaphragm is bonded to the center support with a bonding agent to provide actual structural support during expulsion of the propellant.

In the operation of the apparatus, propellant to be expelled is contained within the rollonet diaphragms and the tank aft end plate 23. Upon command, high pressure gas is introduced into the volume between the tank forward end plate 22 and piston head 14 of the rollonet through the pressurization port 29. The gas pressure exerts a force on the rollonet piston 14 which in turn imparts an axial tensile load on the preroll portions of the inner and outer diaphragms 10 and 11, respectively.

When the gas pressure reaches the required value (dependent on diaphragm diameters, thickness and type of bond to tank) the forces on the diaphragms cause them to roll through 180° and peel away from the tank wall in a progressive manner. The large clearances between the inner and outer edges of the free-floating piston and the inner and outer diaphragms allows the piston to cock up to 10° (due to eccentric loads resulting from an ullage bubble in the propellant) without damage to the diaphragms. Thus the eccentric loads are absorbed and the piston straightens and progresses through the tank. As the diaphragms peel from the tank wall and rollonet supported tube assembly, respectively, and roll down the length of the tank, the piston is allowed to push the propellant ahead of itself and through the outlet port 30 in the tank aft end plate 23 until the entire volume of contained propellant is expelled from the tank.

When complete expulsion is accomplished, the piston 14 will come to rest against the tank aft end plate 23 and the diaphragms 10 and 11 will have rolled back along the tank wall and rollonet support tube assembly a distance equal to ½ the distance travelled by the piston 14. In the final position the rollonet diaphragms have been turned back on themselves until they are concentric cylinders, one within the other, joined together at the roll point.

The rollonet expulsion assembly has the advantages of containing the propellant in non-permeable corrosion resistant metal diaphragms. In addition, the assembly does not require close fitting pistons for sealing or guidance and is not subject to folding. Other advantages reside in maintaining a predictable propellant center of gravity and a free-floating piston.

What is claimed is:

1. A rollonet assembly adapted to contain a liquid therein comprising;
   a cylindrical outer member;
   supporting means surrounding said outer member;
   an inner member;
   an inner support member for maintaining said inner member in spaced relationship with said outer member;
   said inner member being releasably attached to said supporting means along the entire length of said inner member; and
   an end member connecting one end of said outer member and inner member impervious to fluids.

2. A rollonet assembly as set forth in claim 1 wherein;
   said cylindrical outer member is releasably attached along substantially its entire length to said supporting means surrounding said outer member.

3. A rollonet assembly as set forth in claim 2 wherein;
   said inner support member comprises a rigid tubular member in physical contact with said inner member along the entire length thereof.

4. A rollonet assembly as set forth in claim 2 and further including;
   end plates secured to both ends of said cylindrical outer member;
   one of said end plates having an inlet port in communication with said end member connecting one end of said outer member and inner member.

5. A rollonet assembly as set forth in claim 1 wherein;
   said cylindrical outer member is adhesively secured along substantially the entire length thereof to said supporting means surrounding said outer member; and
   said inner member is adhesively secured along substantially the entire length thereof to said inner support member.

* * * * *